United States Patent
Eskonen et al.

(10) Patent No.: US 9,955,554 B2
(45) Date of Patent: *Apr. 24, 2018

(54) LIGHTING CONTROL SYSTEM AND METHOD FOR ASSOCIATION OF NODES IN A MULTI-NODE NETWORK

(71) Applicant: Tvilight B.V., Groningen (NL)

(72) Inventors: Henri Eskonen, Groningen (NL); Amit Gudadhe, Groningen (NL); Jayakrishnan Harikumaran, Groningen (NL); Chintan Shah, Groningen (NL); Ralph Hogenbirk, Groningen (NL)

(73) Assignee: TVILIGHT B.V., Groningen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,525

(22) Filed: Sep. 30, 2016

(65) Prior Publication Data

US 2017/0027042 A1 Jan. 26, 2017

Related U.S. Application Data

(62) Division of application No. 14/768,158, filed as application No. PCT/NL2014/050094 on Feb. 14, 2014, now Pat. No. 9,485,844.

(30) Foreign Application Priority Data

Feb. 18, 2013 (NL) ...................................... 2010324

(51) Int. Cl.
*H05B 37/02* (2006.01)
*H05B 39/04* (2006.01)
*H05B 41/36* (2006.01)

(52) U.S. Cl.
CPC ..... *H05B 37/0227* (2013.01); *H05B 37/0272* (2013.01)

(58) Field of Classification Search
None
See application file for complete search history.

(56) References Cited

U.S. PATENT DOCUMENTS

| 9,485,844 B2 * | 11/2016 | Eskonen | H05B 37/0272 |
| 2010/0201267 A1 * | 8/2010 | Bourquin | H05B 37/0245 315/32 |
| 2012/0059622 A1 | 3/2012 | Cacace | |
| 2012/0143383 A1 | 6/2012 | Cooperrider | |

FOREIGN PATENT DOCUMENTS

WO WO-2013109765 7/2013

* cited by examiner

*Primary Examiner* — Anh Tran
(74) *Attorney, Agent, or Firm* — Marcus C. Dawes; Daniel L. Dawes

(57) ABSTRACT

A lighting control system and method for association of nodes in a multi-node network. The system includes a number of lighting nodes forming a multi-node network, each lighting node including a light source, a controller connected to the light source, and communication means connected to the controller. The lighting control system further includes a memory component adapted to store information relating to at least one group of interrelated coordinates defined in a geographical coordinate system and a processing component in communication with the lighting nodes and adapted to automatically associate at least one lighting node with the at least one group on the basis of the geographical location of said at least one lighting node.

22 Claims, 6 Drawing Sheets

LIGHTING CONTROL SYSTEM AND METHOD FOR ASSOCIATION OF NODES IN A MULTI-NODE NETWORK

The invention relates to lighting control systems. Such systems include a number of light sources and at least one controller connected to the light sources for controlling them, e.g. dimming them, or switching them on or off. Lighting control systems are typically used in street lighting, wherein a number of lampposts illuminate a road, walkway or a square for example. This improves visibility and increases safety.

However, continuously illuminating the streets of an area, such as a city or municipality, requires a large amount of energy. Furthermore, street lighting contributes to a phenomenon called light pollution, which relates to artificial light forming a disturbing factor in the environment for humans and animals, e.g. causing sleep deprivation or animal migration.

In practice, lighting control systems are known wherein each street light is equipped with a daylight sensor, a motion detector and a transmitter and receiver to allow the street lights to communicate with each other. If the daylight sensor of a particular street light determines that the ambient light is below a certain threshold and the motion detector of that streetlight also detects motion, the streetlight switches on and broadcasts a message to other street lights within its range to switch on as well. Although this approach partially addresses the problems stated above by reducing the time the street lights are switched on, this solution is unsatisfactory. For example, when two roads are close together, the movement of a car in the first road may unnecessarily activate the street lights on the second road. The same problem occurs for curvy roads. In other words, there is no relation between the activation pattern of the street lights and the actual lay-out of the streetlights along the road. This leads to unnecessary activation of street lights and corresponding energy consumption and light pollution.

An object of the invention is to overcome or at least reduce the problems of the conventional systems and to provide a lighting control system which takes into account the actual lay-out of the lighting network for its activation pattern.

The object is achieved with the lighting control system according to the invention, the system comprising a number of lighting nodes forming a multi-node network, wherein each lighting node comprises:
  a light source;
  a controller connected to the light source; and
  communication means connected to the controller,
and wherein the lighting control system further comprises:
  a memory component adapted to store information relating to at least one group of interrelated coordinates defined in a geographical coordinate system; and
  a processing component in communication with the lighting nodes and adapted to automatically associate at least one lighting node with the at least one group on the basis of the geographical location of said at least one lighting node.

Possible light sources include any dimmable lamp, such as sodium-vapor lamps, incandescent light bulbs, halogen lamps and LEDs. The invention will be explained mainly in reference to a street lighting application. Other application areas may include lighting in a parking lot, parking garage or indoors.

For example, a group of interrelated coordinates may correspond to a geographical path, route and/or area, defined in a geographical coordinate system. A geographical coordinate system is a spatial coordinate system for defining a spatial location. For example, such a coordinate system includes coordinates for defining a location in a plane, e.g. latitude and longitude. Optionally, the coordinate system additionally or alternatively includes coordinates defining the vertical position of the location, e.g. the elevation.

The lighting control system according to the invention enables establishing the spatial relationships between the lighting nodes. On the basis of the geographical location of a given node, e.g. a GPS coordinate, the processing component determines to which group or groups as defined in the memory this node belongs. For example, the group of interrelated geographical coordinates may correspond to a road, a part or side of a road, or to a square or roundabout. For example, the group may represent a straight or curved path, or a path containing several turns. Therefore, the control system can activate the light sources of selected lighting nodes on the basis of the geographical path or region to which they belong. This leads to activation of the light sources in a manner which corresponds to the physical lay-out of the lighting network, e.g. along a road, a square, or intersection which they are supposed to illuminate. Furthermore, unnecessary activation of light sources is avoided, as only the light sources sharing a common geographical path, area or other predefined spatial relationship, will be activated. Moreover, it is not the communication range which determines the relationship between lighting nodes. According to the invention a path-wise or area-wise association of the nodes can be obtained. Therefore, even if two lighting nodes are within each other's communication range, they will only be associated to each other if they belong to the same group, e.g. they share a path or belong to the same geographical area.

In an example, to automatically associate the nodes to the defined paths, the system determines for each node, which groups of interrelated coordinates are within a certain distance, called the linking radius, from the node. The linking radius defines a circle around each node. Any path, intersection or area which intersects this circle is associated with that node. In other words, any path, intersection or area falling partly within the area of the circle is associated with the corresponding node.

After this procedure has been completed for all nodes, the system can generate a list of all nodes for a given group of interrelated nodes. Preferably, the system automatically assigns an order to the nodes along the path, intersection or area, on the basis of the coordinates of the nodes and the definition of the path, intersection or area.

For example, when a node is linked to a path, the node is ordered on the basis of the point along the path closest to said node. For example, when a node is linked to the path, the point on the path having the shortest Euclidian distance to said node is determined: the "linking point". This is done for all nodes associated to said path. This results in a list of nodes associated to the path and corresponding "linking points". The ordering of the nodes along the path is then determined on the basis of the order in which the "linking points" occur along the path.

In another example, the node is automatically associated, i.e. linked, to the group of interrelated coordinates closest to the node, instead of all groups within a certain radius.

The associations of nodes to groups of related coordinates may be adjusted manually if desired. In one example, the system is arranged to automatically associate a node to a second group of interrelated coordinates when said node is associated to a first group of coordinates. This may for example be advantageous in a situation where a single light illuminates two roads which are close together.

Preferably, the communication means of each lighting node is further adapted for communication with other lighting nodes in the network. Preferably, the multi-node network of lighting nodes is a wireless network. Preferably, the network is an ad-hoc network, more preferably a network having a mesh topology, more preferably a wireless network having a mesh topology.

Preferably, the memory component and/or processing component are provided on a server, preferably a remote server, adapted to communicate with the network of lighting nodes. For example, the multi-node network is provided with a gateway connected to the server, e.g. via the internet. The nodes can communicate with the server via the gateway. Alternatively, each node has its own memory component and processing component. The advantage of using a server is that less components per node are required, reducing the costs and complexity of the system, thereby also reducing the risk of failure. Furthermore, performing calculations centrally on a server leads to faster operation of the lighting nodes, as no calculations have to be performed by the lighting nodes.

The communication means enable communication between the nodes and the processing component.

Preferably, communication between the nodes and the processing component is wireless.

Preferably, the processing component is adapted to send to the nodes information relating to the at least one group associated with the respective nodes. This enables a decentralized control wherein the lighting nodes "know" to which group they belong.

In a preferred embodiment, the processing component is further adapted to automatically associate at least one first lighting node with at least one second lighting node being associated with the same group of interrelated geographical coordinates, e.g. a geographical path or area.

Preferably, the processing component is adapted to send information related to the association of the at least one first node with the at least one second node to the first and second node. For example, the processing component is adapted to send each node associated to a certain group a list of the other nodes which are associated to the same group. Preferably, the processing component is adapted to send to each node information on a selected number (one or more) of the other nodes associated to the same group. For example, the processing component sends a node information indicating its direct neighbors along a path, e.g. the lighting nodes directly to the right and left of the node.

In the context of the application, a direct or first order neighbor of a first node is a second node which is directly next to the first node on the respective path or within the respective area. The second order neighbor of a first node is a second node which is separated from the first node by exactly one other node. Generally, an n-th order neighbor of a first node is a second node which is separated from the first node by exactly (n−1) other nodes. For example, for nodes A, B, C, D and E arranged in that order along a common path, node C has first order neighbors B and D and second order neighbors A and E, and node E has first order neighbor D, second order neighbor C, third order neighbor B and fourth order neighbor A.

In a further preferred embodiment, the processing component is further adapted to automatically determine the separation between said at least one first lighting node and said at least one second lighting node in the same group, e.g. along the same path.

The separation between the nodes may be expressed as a distance, e.g. a distance expressed in meters. Preferably, the separation between the nodes is expressed as a discrete number n representing the separation in terms of nodes. For example, first order neighbors are assigned n=1, whereas the second order neighbors are assigned n=2, and so on.

The separation information can be used in controlling the lights. For example, the lighting control system is configured such that only a fixed number of consecutive neighbors on the same path are activated, e.g. 3-10 consecutive nodes. In another example, all nodes of a group within a distance of 50 m from the point of detection are activated.

Preferably, the processing component is adapted to communicate the separation information to the nodes, preferably using wireless communication.

In a preferred embodiment, at least one lighting node comprises:
    an object detector connected to the controller; and
    a memory adapted to store information identifying at least one other lighting node which is associated by the processing component to the same group,
wherein this at least one lighting node is adapted to send a control signal to one or more of the at least one other lighting node identified by the information in the memory upon detection of an object by the object detector for controlling the light source of said one or more of the at least one other lighting node.

One or more of the lighting nodes may be equipped with an object detector, such as a motion detector. Examples of motion detectors include passive infrared (PIR) motion detectors, radar and cameras. In the following text, lighting nodes comprising an object detector are referred to as detector nodes.

In another example the object detector is a sensor which can detect changes of the local electric potential and/or changes in the local electric or magnetic field. In a further example, multiple of such sensors are used to map and visualize a 2D/3D gradient field-line map, and act upon the basis of said map.

For example, objects to be detected with the object detector are a car, a truck, a bicycle, a pedestrian, a motorcycle, a moped, a scooter or a person on roller skates or a skateboard.

A detector node stores in its memory information about the nodes which belong to the same group of interrelated geographical coordinates as the detector node. This information is obtained from the processing component. For example, the memory comprises a list of all nodes on the same predefined path, or all nodes within the same predefined area. In another example, the memory comprises a list of a selected number (one or more) of nodes in the same group. The nodes may be referred to using a unique identification number (ID). In another example, the memory of the detector node stores a database which includes entries for each group to which the detector node belongs, each entry comprising a list of the other nodes belonging to that group.

For example, the processing component determines that nodes A, B and C belong to group Z, which may for example correspond to (a part of) a road, a square, a parking garage level or a tunnel. Node A is a detector node, e.g. equipped with a PIR motion sensor. The processing component determines the nodes which belong to the same group as node A, i.e. B and C, and communicates this information to node A. For example, node A stores this information in its memory, e.g. as a tuple variable ("group Z"; "B, C") or alternatively as a single variable ("B, C"). When detector node A subsequently detects motion, e.g. when a car, bicycle or pedestrian passes by, it switches its light source to a high output level and sends a control signal, e.g. a wireless message, to nodes B and C, as they are associated with the same group as node A. Upon receiving the control signal, the nodes B and C also switch their respective light sources to a higher level.

The detector node sends a control signal only to the at least one other lighting node identified by the information in the memory. This avoids sending a message to every node in the network. Therefore, overloading of the network is avoided. Furthermore, redundant or unnecessary network traffic is avoided. In the preferred case of wireless communication, interference with other applications, e.g. wifi internet, may be reduced.

Preferably, the processing component sends to each detector node information on a selected number (one or more) of the other nodes in the same group. For example, the processing component sends to each detector node information identifying the neighbors of that node up to a predefined order, e.g. its first order neighbors or its first and second order neighbors. The detector node stores this information and upon detection of an object sends a control signal only to the nodes in its memory.

A further advantage of this embodiment is that the detector nodes can comprise a simple logic for sending the control signals, whereas the more complicated determination of the geographical interrelationship between different nodes is performed automatically by the processing component, preferably on a server.

All nodes or only some nodes may be equipped with an object detector.

Optionally, a detector node comprises a daylight sensor and the controller is adapted to only send a control signal if the daylight sensor detects ambient light below a certain threshold, such that the lighting nodes only activate their light sources when it is dark. Another option is to include a timer such that control signals are only generated between certain times of the day, e.g. between 20:00 and 7:00. The starting and ending times may be made dependent on the date, e.g. according to a sunrise/sunset time table. Preferably, the processing component sends to the nodes a time table for switching on/off.

Optionally, the controller is adapted to gradually ramp up the light intensity at sunset and/or gradually ramp down the light intensity at sunrise, e.g. ramping up/down within 20 min from low/high intensity to high/low intensity respectively.

Preferably, the lighting nodes are configured to switch their light sources off or to a low light level after a predetermined time.

Preferably, this embodiment includes that the processing component is adapted to determine the separation between the detector node and the at least one other node within the same group. As explained above, separation information can be used in controlling the lights. For example, the lighting control system is configured such that only the lighting nodes up to a predefined separation from a detector node are activated, e.g. only its first order neighbors or only its first and second order neighbors.

For example, nodes A, B, C, D and E are associated to the same group of interrelated geographical coordinates, in this case a path. Node C is a detector node. Initially the light sources are operating at a low light level, e.g. switched off or switched on at a low light level such as 40% of the maximum intensity. When node C detects an object, it switches its light source to a higher light level, for example 90-100% of maximum intensity. Furthermore, it sends a message to its first order neighbors only, i.e. B and D. On receiving the message, node B and D switch their light source to a higher light level as well. At a predetermined time after their activation, e.g. 10 s-10 minutes, the light nodes B, C, D switch their light back to the low light level. Preferably, switching back to a low light level is executed gradually, e.g. a drop from 100% to 40% in 10 s-2 minutes time.

Sending control signals to a selected number (one or more) of the at least one other nodes on the basis of the separation between said nodes further reduces the number of messages communicated between nodes in the network. Therefore, overloading of the network is avoided. Furthermore, redundant or unnecessary network traffic is avoided. In the preferred case of wireless communication, interference with other applications, e.g. wifi internet, may be reduced.

In a further preferred embodiment, the control signal comprises light level information for controlling the intensity of the light source of said at least one other lighting node, the light level information being based on information about the separation between the at least one lighting node and said at least one other lighting node.

This enables even more elaborate lighting patterns. For example, the control system can establish a gradient light level around the moving object, as it moves with respect to the lighting nodes.

For example—returning to the example above with nodes A, B, C, D and E associated with the same path—when C detects an object, it switches its light source to a 100% level and sends a message to B and D to switch their light source to an 80% level and to A and E to switch their light source to a 50% level. Therefore, a light envelope is created around the moving object.

Preferably, the detector node stores information about the separation in its memory. For example, the processing component determines the separation between a detector node and its neighboring nodes, e.g. first order neighbor, second order neighbor, etc. The processing component sends this information to the detector node. The detector node stores the information and upon detection of an object sends a control signal to each of the neighboring nodes contained in its memory, wherein the control signal comprises light level information based on the separation between the detector node and the respective neighboring node.

Instead of storing information about the separation, the detector node may be configured to store light level information associated with its neighboring nodes. In this case, the processing component determines the appropriate light levels on the basis of the separation and sends this light level information to the detector node. For example, the memory of the detector node stores a table comprising the nodes to which it is to send a control signal upon detecting an object and for each node a light level to include in the control signal. This simplifies the logic to be implemented on the detector nodes.

In another example, the control signal includes information identifying the detector node. Furthermore, each of the at least one other nodes is adapted to set their light levels based on the separation between the respective other node and the detector node upon receiving the control signal.

In a further preferred embodiment, the object detector is a motion detector adapted to detect the speed of the detected object and the detector node is adapted to send a control signal to a selected at least one other lighting node based upon the speed detection by the motion detector.

For example, the motion detector comprises a radar, camera or PIR motion sensor. Preferably, the motion detector is able to distinguish between at least two speed ranges. For example, the motion detector distinguishes objects moving with a speed from 3-7 km/h, objects with a speed of 7-25 km/h and object with a speed exceeding 25 km/h, corresponding to typical speeds of pedestrians, bicycles and cars.

The control signal generated by the detector node may depend on the detected speed. Furthermore, the group of nodes to which the detector node sends a control signal may depend on the detected speed. For example, if a high speed object is detected, a control signal will be sent to more of the other lighting nodes, such that a larger part of the path or area to which the detector node belongs is illuminated than would be the case for a lower detected speed.

For example, a node A detects an object at a speed of 5 km/h. Detector node A switches its light source to a 100% level and sends a message to its first order neighbors on the same path to switch their light source to an 80% level, thereby creating a light gradient along the path which is sufficient for this speed. In another example, node A detects an object at a speed of 20 km/h. Detector node A again switches its light source to a 100% level. Instead of only sending a control signal to its first order neighbors, it now also sends a control signal to its second order neighbors, to increase their light output to a 100% level as well. Furthermore, it sends a control signal to its third order neighbors to switch their light source to a 80% level. Therefore, a larger light envelope is created for this higher speed.

For example, the memory of the detector node stores different lists of neighboring nodes corresponding to different speeds. In the example above, detector A stores a first list comprising its first order neighbors, to which it sends a control signal upon detection of a relatively slow object. Detector A further stores a second list comprising its first, second and third order neighbors, to which it sends a control signal upon detection of a faster moving object. In another example, the memory of the detector node stores a single table of neighboring nodes, wherein the table comprises for each node a definition for which speed the detector node sends a control signal to that node, and preferably also corresponding light level information.

In a preferred embodiment, the detector node is arranged to send a control signal to a selection of the at least one other lighting node identified by the information in the memory upon detection of an object by the object detector, the selection being based on a control signal previously received by the detector node.

Therefore, the number of control signals which the detector node will send may depend on one or more control signals which the detector received prior to the detection of an object by the detector node.

For example, the detector node is adapted to send a control signal to the at least one other nodes in its memory, except those other nodes which have sent a control signal to the detector node within a predetermined interval prior to detection of an object by the detector node. For example, the interval spans the last 2 minutes, the last minute or the last 30 s. As the nodes which recently sent a control signal to the detector node have recently detected an object, they will already be switched on. Not sending a control signal to those nodes will decrease network traffic in the node network. Therefore, overloading of the network is avoided. Furthermore, redundant or unnecessary network traffic is avoided. In the preferred case of wireless communication, interference with other applications, e.g. wifi internet, is reduced significantly.

Furthermore, incorporating previously received control signals in the logic of the at least one detector node enables detecting a direction of an object passing multiple nodes. Preferably, the information identifying other nodes stored in the memory of the detector node is distinguished in a first and second group of nodes, wherein the detector node is adapted to, upon detection of an object:

send a control signal to the nodes belonging to the first group of nodes if it previously received a control signal from a node belonging to a third group of nodes; and send a control signal to the nodes belonging to the second group of nodes if it previously received a control signal from a node belonging to a fourth group of nodes.

For example, the first group of nodes corresponds to nodes on one side of the detector node, e.g. left. The second group of nodes in this example corresponds to nodes on the other side of the detector node, e.g. right. Depending on which control signals were recently, e.g. within the last 2 minutes, received by the detector node, it sends a control signal to the nodes on its left or its right. This enables an asymmetric lighting pattern which follows the moving object. In this example, the third and fourth groups of nodes correspond to groups of nodes on the right and left of the detector node respectively. If the detector node previously received a control signal from a node on its right (third group), it sends control signals upon detection of an object to its left (first group). If the detector node previously received a control signal from a node on its left (fourth group), it sends control signals upon detection of an object to its right (second group). The first and fourth group of nodes may be the same, or may comprise a different set of nodes. The same holds with respect to the second and third group of nodes.

It is noted that no strict separation between left and right is required. For example, the detector node may send control signals to three nodes on the left and one on the right if it previously received a control signal from a node on its right.

Moreover, incorporating the previously received control signals into the logic of the detector node enables detecting a speed or at least a speed range of an object moving past the lighting nodes.

In a preferred embodiment, each lighting node is adapted to communicate its location to the processing component.

For example, the nodes include a GPS device to determine its location.

Preferably however, each node comprises an internal memory in which its location can be programmed. As the nodes will have fixed locations in most applications, this obviates the need for a GPS device, which is cost-effective. For example, the internal memory can be programmed upon installation of the lighting node, wherein an external GPS device, e.g. a smartphone, laptop or dedicated device, is temporarily connected to the lighting node via a communication port, NFC connection, wifi or other means, to store the GPS coordinates obtained by the external device in the internal memory of the lighting node. Alternatively, a user can manually input the geographical coordinate, e.g. by means of connecting a keyboard. In other words, the node is configured such that the memory can be programmed manually or by using a disconnectable external device, i.e. a device external to the node which can be connected temporarily to the node, such that the memory stores the coordinate of the node without the node performing a measurement, i.e. a measurementless programming of the memory is obtained.

In a currently preferred embodiment, the system comprises a database component connected to the processing component, the database component comprising a database which relates information identifying the lighting nodes to the geographical location of the nodes.

This has the advantage that the geographical coordinates of the nodes are stored centrally. This obviates the need for storing the location on the node or determining the location by the node itself. Preferably, the database is editable. This enables fast and easy correction of the location of the nodes of the system, e.g. when the position of the lighting nodes is changed or when an error has been made in programming the node location.

In a preferred embodiment, the nodes comprise an identifier for identifying the nodes, preferably the identifier being a unique identifier.

For example, during installation the identifier of the node is read out by the installer. The installer also determines the GPS location of the node, e.g. by using a smartphone. The node identifier and corresponding GPS position are added to the database, e.g. by accessing the database over the internet.

For example, the identifier comprises a MAC address, a bar code, QR code, RFID tag or NFC tag.

In one embodiment, the processing component is adapted to obtain the geographical location of a lighting node from the database upon receiving information identifying said lighting node from said lighting node. In other words, the lighting nodes send an identifier (ID) to the processing component, which the processing component can link with the correct location by using the database.

In a preferred embodiment, the system further comprises a visualization component connected to the processing component and is adapted to show the locations of the lighting nodes in the network and/or the groups of interrelated coordinates, e.g. paths or areas, on a map on an electronic display.

For example, the locations of the nodes of the network and/or the groups as defined in the memory, e.g. paths or areas, are displayed as an overlay on digital mapping tools, such as Google Maps™ or Bing Maps™. This enables an administrator of the system to get an overview of the system. Furthermore, errors in the node location information are easily spotted, e.g. when a certain node clearly falls outside the working area of the system. Preferably, the visualization component is adapted to indicate for each node to which group of interrelated coordinates they are linked.

Preferably, the visualization component is included on a server, e.g. the same server which comprises the processing component and the memory component. Preferably, the server comprises a login component for remote access to the visualization component. For example, the server comprises a web-application accessible over the internet, which shows authorized users the map comprising the nodes and/or stored groups.

In a further preferred embodiment, the system further comprises a configuration component connected to the memory component of the lighting control system and adapted to edit the information related to the at least one group of interrelated coordinates stored in said memory component on the basis of user input.

Preferably, the configuration component is also included on a server, e.g. the same server which comprises the visualization component. Preferably, the server comprises a login component for remote access to the configuration component. For example, the server comprises a web-application accessible over the internet, which enables users to edit the defined groups.

Preferably, the system is adapted such that the visualization component provides a graphical user interface for editing the defined groups. For example, the user can edit existing groups by selecting them on the map and/or create new groups by drawing a path or selecting an area on the map. Alternatively or additionally, the system provides a text based user interface for editing groups.

Additionally or alternatively, the configuration component may be adapted to edit the information related to the at least one group of interrelated coordinates stored in said memory component on the basis of an algorithm. Although the system assigns each node to a group of interrelated coordinates automatically, it may be desirable to update this information afterwards. For example, the layout of the roads have been changed, nodes have been added or removed, or the algorithm for assigning the nodes has been updated. The invention therefore enables performing algorithms after the initial assignment of the nodes.

In a preferred embodiment, at least one of the at least one group of interrelated coordinates represents a path defined in the geographical coordinate system.

In a further preferred embodiment according to the invention, the processing component is further adapted to automatically determine intersections of said paths and to associate at least one lighting node with at least one intersection on the basis of the location of the respective lightning node.

In addition to using areas or paths to identify groups of lighting nodes which belong together, intersections can be used to group lighting nodes. When paths are defined in the memory component, the processing component can preferably automatically calculate if intersections of the defined paths exists.

For example, in a 2D Cartesian coordinate system, path Z is defined by the points (0,0), (10,0), (10,20) and (20,20), path Y is defined by the points (15,30), (15, 15) and (0,15). The processing component determines that path Y and path Z intersect at point (10,15) and (15,20). It stores these intersections in the memory component, e.g. ("intersection 1", "path Y", "path Z", (10,15)) and ("intersection 2", "path Y", "path Z", (15,20)). The nodes which are close to these intersections are determined. A message is sent to each of the nodes of the intersections. For example, node A receives a message that it shares an intersection with nodes B, C and D.

This information can be used to formulate rules for illuminating an intersection. Intersections on a road are places where one should be particularly alert of other traffic, therefore programming an additional or alternative activation protocol for light sources near intersections is particularly advantageous.

It is noted that the above can be implemented in a similar way as described with respect to association of nodes to groups. Preferably, the processing component is adapted to automatically determine the relationships between the nodes, e.g. to which path and/or intersection they belong, and to send to each detector node a list of other nodes to which to send a control signal upon detection of an object. In such a configuration of the system, the nodes do not "know" about paths or intersections, they only know what control signal to send to which other nodes. This simplifies the logic implemented in the individual nodes.

As described above, the group of nodes to which the detector sends a control signal and light level information in the control signal may depend on the speed of the detected objected and/or the separation between the detector node and the respective other node.

In a preferred embodiment, the processing component is further adapted to automatically generate groups of interrelated coordinates, e.g. paths or areas, on the basis of geographical data.

By automatically generating the groups of interrelated coordinates, the system according to the invention is easily configurable, as paths, areas or other geographical relations do not need to be defined manually.

For example, geographical data can be obtained from web-based mapping services, such as Google Maps™ or Bing Maps™.

For example, the processing component loads geographical data comprising a map image and associated coordinates. The processing component then extracts the groups of interrelated coordinates on the basis of the colors used in the map image and determines the corresponding coordinates. For example, if the map image uses gray to indicate roads, the processing component determines the coordinates corresponding to the gray areas on the map image to obtain a description of a path.

The invention further relates to a lighting control system comprising a number of lighting nodes forming a multi-node network, each lighting node comprising:
   a light source;
   a controller connected to the light source; and
   communication means connected to the controller,
wherein at least one lighting node comprises:
   an object detector connected to the controller; and
   a memory adapted to store information identifying at least one other lighting node which is associated to said at least one lighting node,
wherein this at least one lighting node is adapted to send a control signal to the at least one other lighting node identified by the information in the memory upon detection of an object by the object detector for controlling the light source of said at least one other lighting node. In other words, this further lighting control system according to the invention does not comprise a memory component and processing component as described above.

Preferably, the control signal comprises light level information for controlling the intensity of the light source of said at least one other lighting node, the light level information being based on information of the separation between the at least one lighting node and said at least one other lighting node.

Preferably, the object detector is a motion detector adapted to detect the speed of the detected object and the at least one lighting node is adapted to send a control signal to a selected at least one other lighting node based on the speed detected by the motion detector.

Preferably, the lighting node which comprises the object detector is arranged to send a control signal to a selection of the at least one other lighting node identified by the information in the memory upon detection of an object by the object detector, the selection being based on a control signal previously received by said lighting node.

The invention further relates to a method for associating a node of a multi-node network with at least one other node of the network. The method comprises:
   storing information relating to groups of interrelated coordinates defined in a geographical coordinate system;
   determining the location of said node in the geographical coordinate system;
   automatically associating said node to at least one of the groups of interrelated coordinates on the basis of the location of the node; and
   automatically associating said node to at least one other node being associated with the same group.

The same effects and advantages as described above in relation to the lighting control system apply to the method according to the invention. Furthermore, the features of the system and the method according to the invention can be combined as desired. Preferably, the method according to the invention is performed using the lighting control system according to the invention.

In a preferred embodiment, the method further comprises automatically determining the separation between said node and said at least one other node being associated with the same group.

In a further preferred embodiment, the method further comprises:
   storing the information relating to groups on a server connected to the multi-node network; and
   sending information from the server to the node on the basis of the associated group.

In an embodiment, determining the location of the node comprises:
   providing the node with a memory for storing its GPS coordinate;
   determining the GPS coordinate of the node using an external GPS device; and
   storing the GPS coordinate of the node in the memory.

In a further preferred embodiment, determining the location of the node comprises providing a database which associates nodes with locations.

In a currently preferred embodiment, determining the location of the node comprises:
providing the node with an identifier;
determining the identifier associated with the node;
determining the geographical location of the node; and
storing the identifier and corresponding geographical location in the database.

Preferably, the identifier is a unique identifier.

For example, the geographical location is determined using an external GPS device.

For example, the identifier includes a barcode, QR code, RFID tag or NFC tag. Preferably, the method comprises providing a handheld device, such as a smartphone or laptop, comprising a GPS device and means for obtaining the identifier of a node. For example, the device includes a barcode scanner, QR code scanner, RFID reader or NFC reader. The method further comprises using the handheld device to obtain the identifier of the node and the GPS position of the node, and subsequently storing the obtained identifier and corresponding position in the database, e.g. via a wireless internet connection with the processing component.

In a further preferred embodiment, the method further comprises showing the location of at least one of the nodes and/or at least one of the groups of interrelated coordinates on a map on a electronic display.

In a further preferred embodiment, the method further comprises automatically determining groups of interrelated coordinates, such as paths and intersections, on the basis of geographical data.

The invention further relates to a system for performing the method according to the invention, the system comprising a multi-node network, a memory component adapted to store information relating to groups of interrelated coordinates defined in a geographical coordinate system, a processing component adapted to determine the location of the node in the geographical coordinate system, to associate a first node of the multi-network to at least one of the groups of interrelated coordinates on the basis of the location of the node and to associate said first node to at least one other node being associated with the same group of interrelated coordinates. For such a system the same effects and advantages apply as described above for the method according to the invention.

Further details, effects and advantages of the invention will be elucidated on the basis of exemplary embodiments thereof, wherein reference is made to the accompanying drawings.

Figure 1:
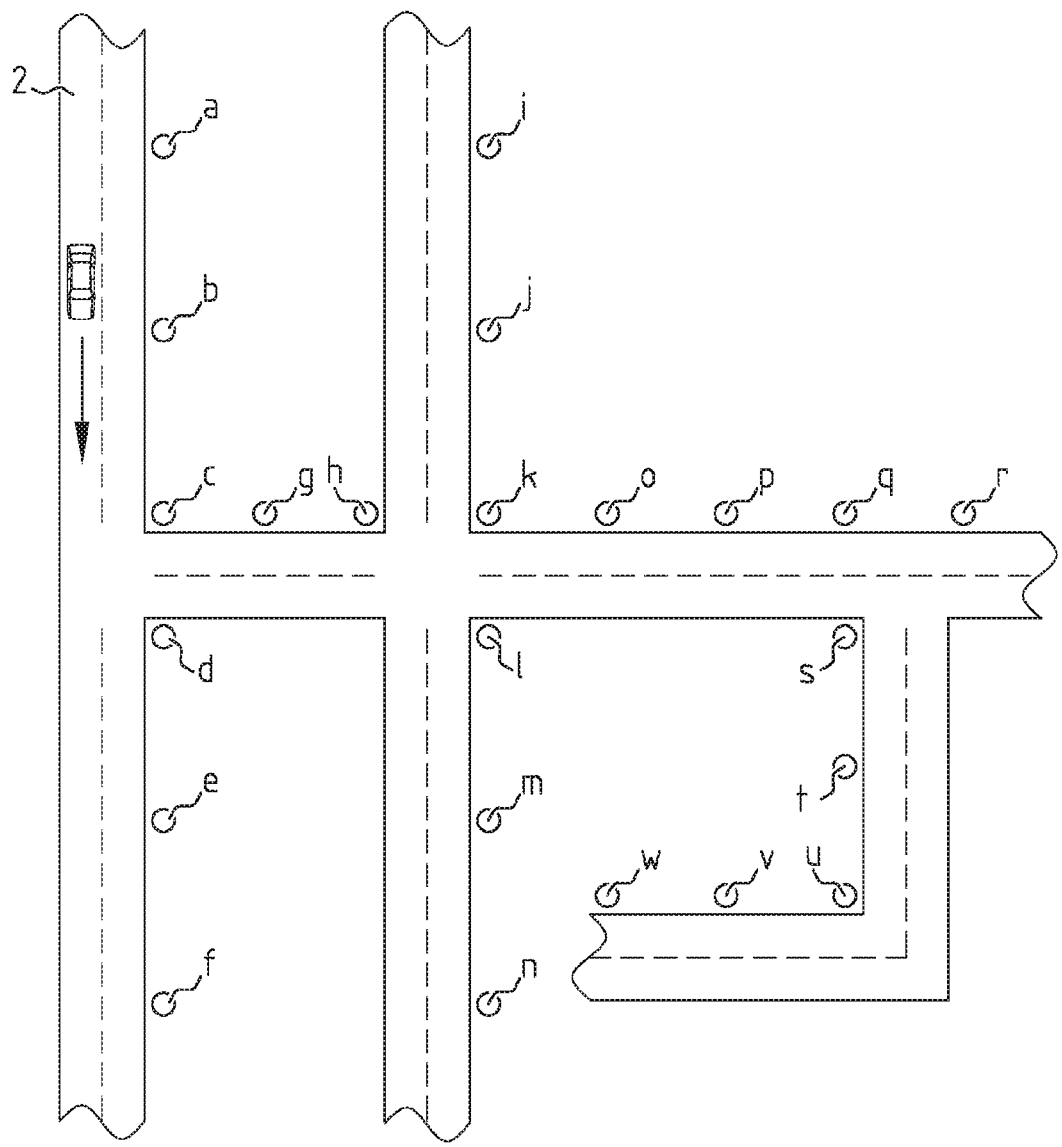
FIG. 1 shows a schematic of a road with a light control system according to an embodiment of the invention.

A network of roads 2 (FIG. 1) has been provided with a system according to the invention. The system comprises lighting nodes (a-w) provided next to the road. Each lighting node comprises a light source for illuminating part of the road. Each lighting node is equipped with a wireless communication device for communicating with other nodes. Furthermore, each node is equipped with a motion detector capable of detecting moving objects and determining their speed or at least determine in which speed range the detected object falls. The nodes communicate using the ZigBee standard for wireless mesh network communication. Alternatively, a different standard is used.

Figure 2:
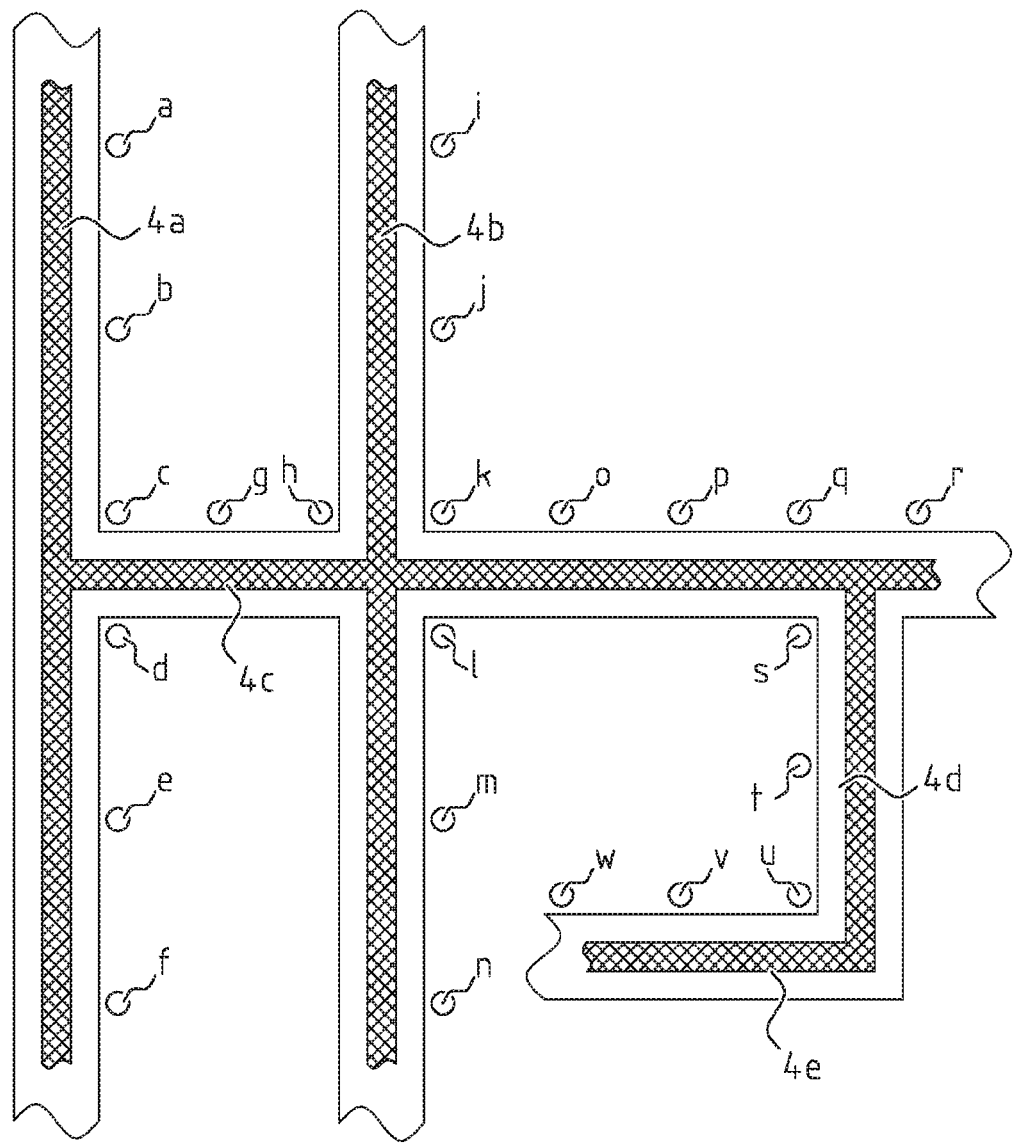
FIG. 2 shows the groups of interrelated coordinates for the system of FIG. 1, in this case these groups correspond to paths.

Five paths 4a-e are defined (FIG. 2). Path 4a passes nodes a-f, path 4b passes nodes i-n, path 4c passes nodes c, g, h, k, o, p, q, r, path 4d passes nodes s-u and path 4e passes node u-w. The paths are defined automatically by the system on the basis of geographical data, e.g. using Google Maps™.

Figure 3:
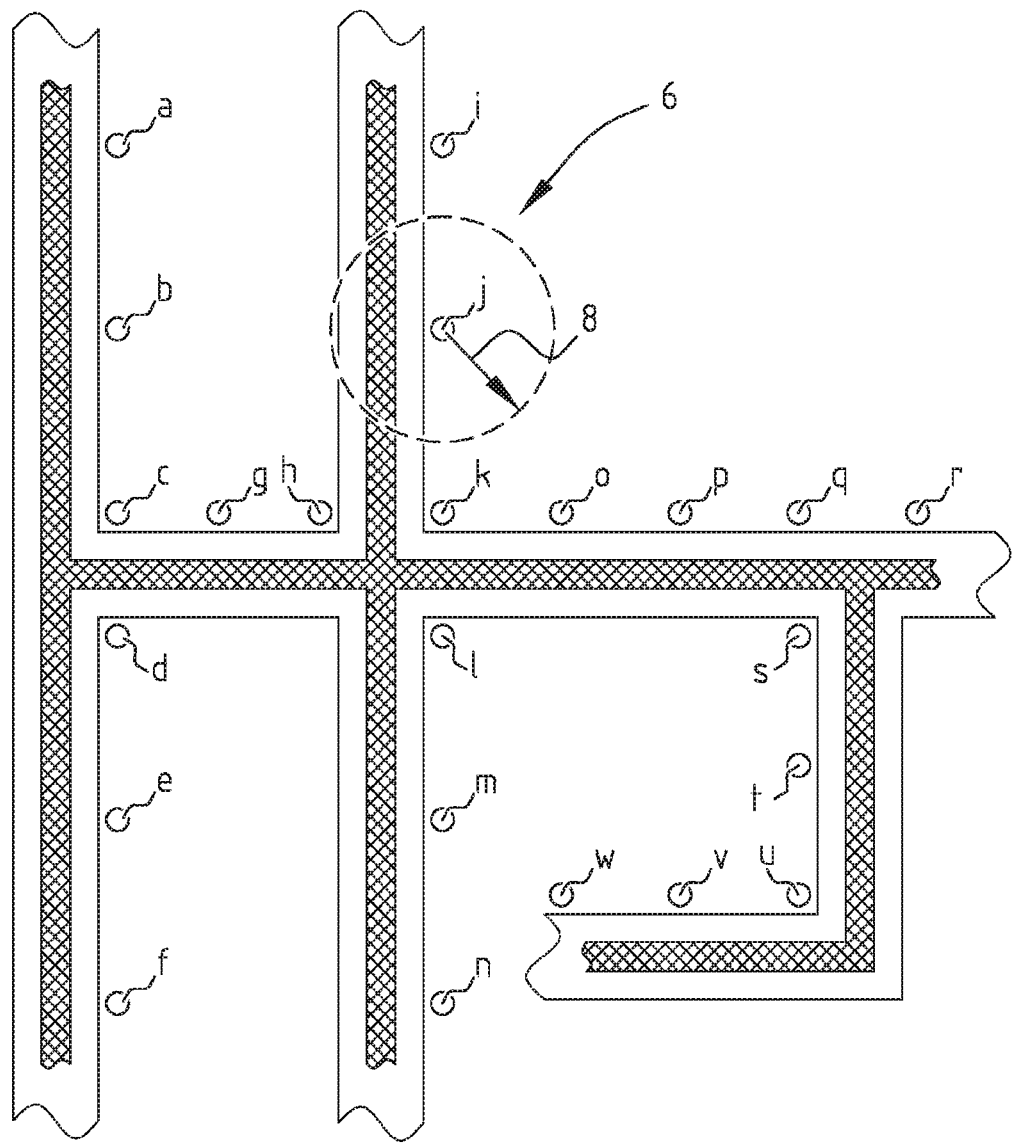
FIG. 3 shows the association of one of the nodes to one of the paths in the system of FIG. 1.

To associate the nodes to the defined paths, the system determines for each node, which paths are within a certain distance, called the linking radius 8 (FIG. 3). The linking radius defines a circle 6 around each node. Any path which intersects this circle is associated with that node.

For example, for node j as shown, the only path within the linking radius is path 4b. Therefore, the system assigns node j to path 4b. For node k, both path 4b and path 4c are within the linking radius. Thus, in this case the system assigns node k to both path 4b as path 4c.

Figure 4:
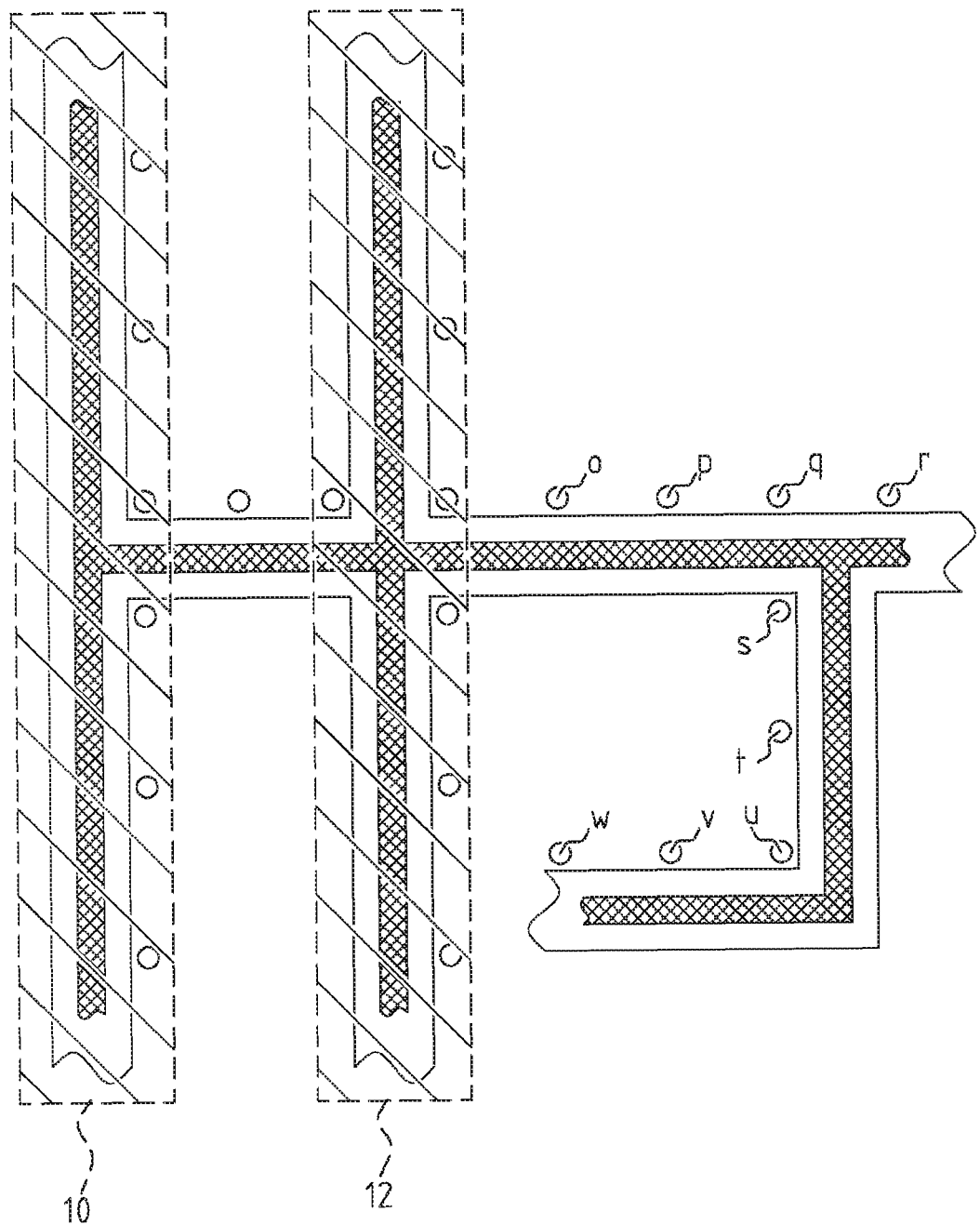
FIG. 4 shows the system of FIG. 1, wherein groups of nodes belonging to the same path have been indicated.

After this procedure has been completed for all nodes, the system can generate a list of all nodes for a given path. For example, path 4a includes the group 10 of nodes a-f (FIG. 4) and the path 4b includes the group 12 of nodes i-n.

Figure 5:
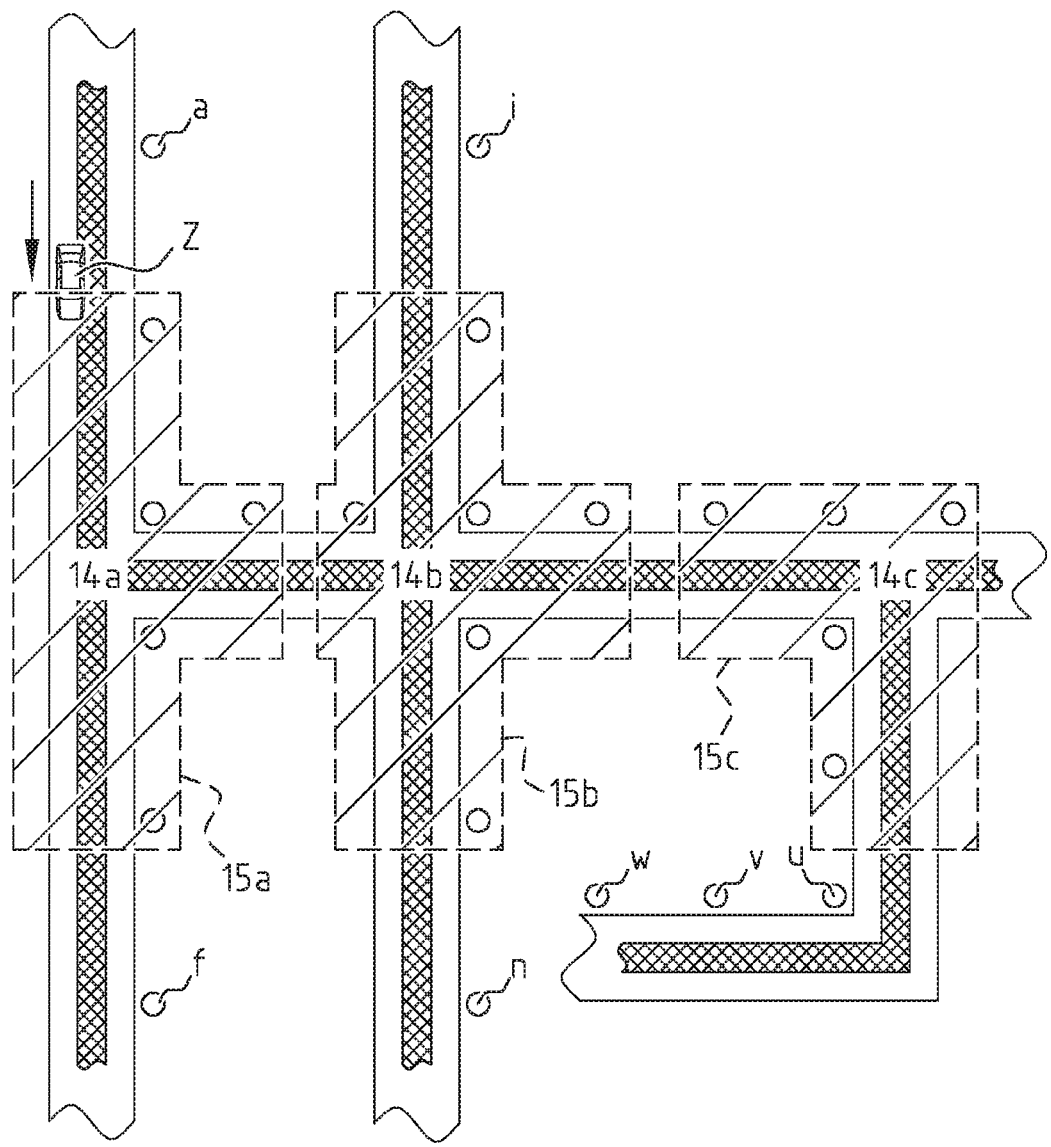
FIG. 5 shows the system of FIG. 1, wherein groups of nodes belonging to intersections have been indicated.

Subsequently, the system automatically establishes which paths intersect and which nodes are near these intersections. The system finds three intersections 14a, 14b and 14c (FIG. 5).

After determining to which paths and intersections the nodes of the system belong, the system determines for each node to which neighboring nodes it should send control signals. This determination may depend on a set of predetermined rules. For example, the rules are:

1) on detection of a moving object, the first order neighbors of the detecting node should be activated to an 80% light level; and 2) if the detecting node is close to an intersection, all nodes associated to that intersection should be activated to a 100% level.

For example, for node v the system determines that it has first order neighbors w and u and that node v is not associated with an intersection. Therefore, the processing component sends a message to node v to send the following control signals upon detection of an object:

1) a control signal to node w for switching to an 80% light level (same path); and 2) a control signal to node u for switching to an 80% light level (same path).

Node v stores this information in its memory, for example as two entries in a table.

For node c, the system determines that it is associated with an intersection, therefore the processing component sends a message to node c to send a control signal to control nodes b, d, e and g to switch to 100% upon detection of an object by node c.

In the current preferred embodiment, the set of rules define that each node in an intersection group triggers the other nodes in the group. Furthermore, each node on a path triggers its first order neighbors (as in the previous example).

In this case, the system determines that node b should send the following control signals:

1) a control signal to node a to switch to an 80% light level (same path);

2) control signals to c, d, e and g to switch to a 100% light level (same intersection group).

This information is sent to node b, which stores it in its memory. Upon detecting an object, node b will send the control signals as prescribed by the system according to the instructions in its memory.

An example illustrating the preferred embodiment will be given next. A car Z drives along the road (FIG. 5). All nodes a-w are initially operating their lights at a low level of 40%. When car Z follows path 4a, it will first pass node a. Upon detecting car Z, node a will switch its light to a level of 100%. Subsequently, it will determine what control signals to send by checking its memory. As explained above, the information in the memory of node a indicates that node a should send a control signal to node b to switch the light of b to an 80% light level. Upon receipt of this message node b operates as requested and switches to an 80% light level. As the car moves further along its path it passes node b. Node b will detect the car and switch its light to a level of 100%. Subsequently, it checks its memory to determine which control signals to send. As explained above, node b will send a message to node a to switch the light level to an 80% level and a message to nodes c, d, e and g to switch their lights to a level of 100%. Node a is already operating at a 100% light level when it receives the message from node b. In one configuration of the system node a reduces its light level to 80% as requested. In a currently preferred configuration the nodes are configured to ignore messages requesting for a lower light level than the current light level. In this case, node a will continue to operate at a 100% light level. All nodes will continue to shine at the requested high level for a predetermined time, after which they will return to their low light level state, preferably gradually. In this example, the message of node b retriggers the timer of node a, such that it will shine at a 100% light level for a longer period of time.

The rules describing which lighting nodes should switch to a higher light level can be made dependent on the speed of the detected object. For example, for an object having a first speed only first order neighbors are activated, while for an object having a second speed, also second order neighbors are activated.

Furthermore, these rules may even vary between different geographical areas. For example, different rules may be applied to rural areas than to urban areas. Whether a geographical area is classified as a rural or urban area can be determined automatically, e.g. on the basis of a digital mapping service.

Figure 6:
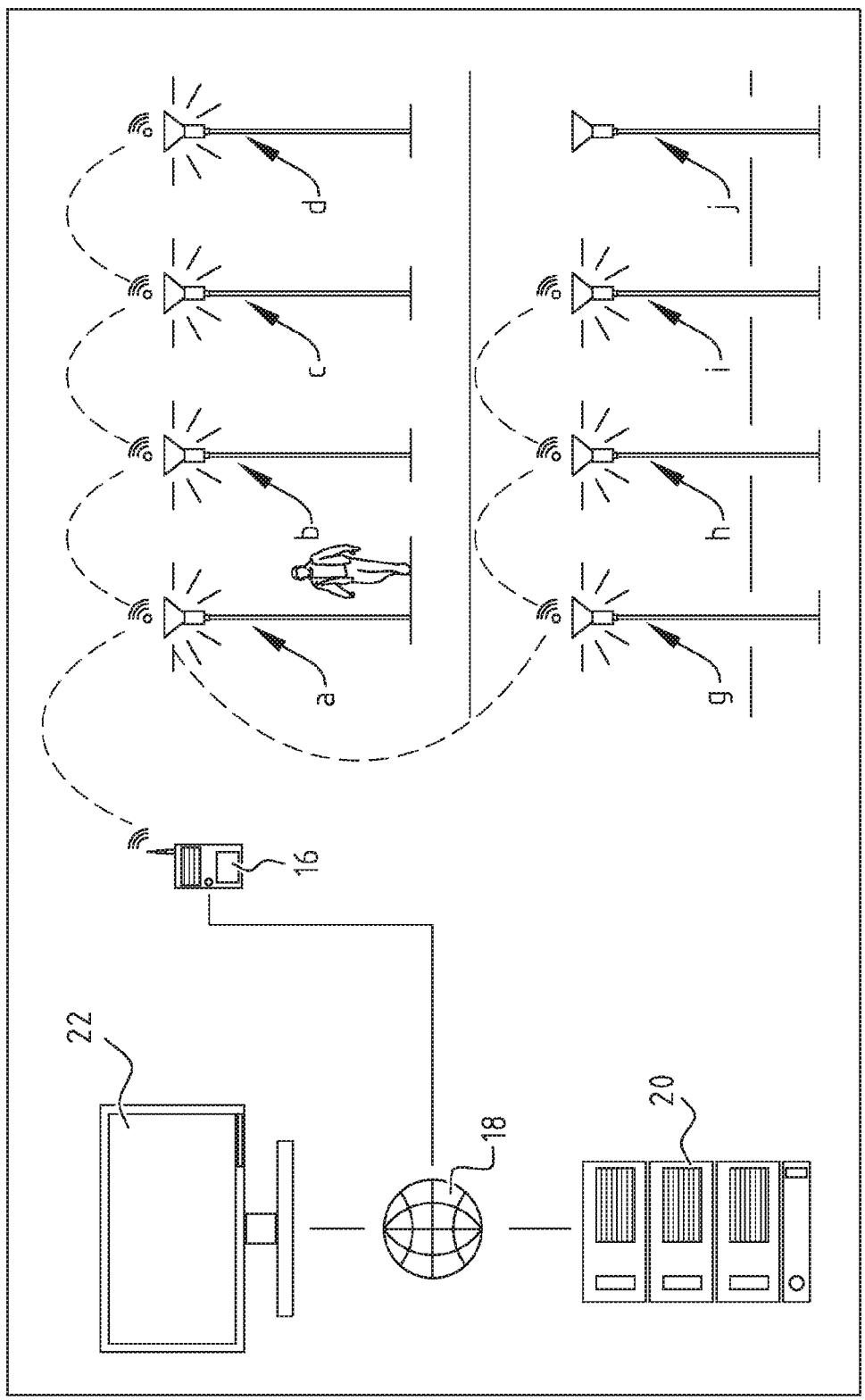
FIG. 6 shows a schematic drawing of the components of the system according to FIG. 1.

The nodes (FIG. 6) communicate wirelessly with each other. They relay messages from other nodes. This network topology has been proven to be reliable, as the nodes will still be able to communicate with each other if one of the nodes fails. The system is further provided with gateway 16. Messages from the nodes a-w to the processing component are collected by gateway 16 and then relayed to server 20 via a secure connection over the internet 18. Server 20 comprises the processing component and the memory component storing the information related to the groups of interrelated coordinates, such as path and/or intersection data. For example, server 20 sends information about the neighbors of node c to node c. Server 20 sends the message to gateway 16 via internet 18, after which gateway 16 sends it via the wireless network of the nodes a-w to node c. Upon receipt of the request, node c updates its list of neighbors.

Of course, multiple gateways 16 can be provided to improve the redundancy and reliability of the system.

The server 20 can be accessed by a user using a terminal, such as PC 22 or a smartphone or tablet. Using a browser, the user navigates to a log-in page on the server 20. Once successfully logged in, the user can obtain an overview of the nodes in the system projected on a map on the display of his PC 22. For example, the map will look similar to FIG. 2. Furthermore, the user may edit the groups of interrelated coordinates—in this case paths and intersections, the node locations and other settings of the system using the web based control software.

The present invention is by no means limited to the above described preferred embodiments thereof. The rights sought are defined by the following claims, within the scope of which many modifications can be envisaged.

The invention claimed is:

1. Lighting control system comprising:
   a number of lighting nodes forming a multi-node network;
   a memory component adapted to store information relating to at least one group of interrelated coordinates defined in a geographical coordinate system; and
   a processing component in communication with the lighting nodes and adapted to automatically associate at least one lighting node with the at least one group of interrelated coordinates on the basis of the geographical location of said at least one lighting node by determining which groups of interrelated coordinates are within a predetermined distance from the at least one lighting node
   wherein each lighting node comprises:
      a light source;
      a controller connected to the light source;
      communication means connected to the controller; and
      an internal memory in which a coordinate location of the light node is stored, such that the coordinate location is known without the node having to perform a location measurement.

2. Lighting control system according to claim 1, the processing component being further adapted to automatically associate at least one first lighting node with at least one second lighting node being associated with the same group of interrelated coordinates.

3. Lighting control system according to claim 2, the processing component being further adapted to automatically determine the separation between said at least one first lighting node and said at least one second lighting node in said group of interrelated coordinates.

4. Lighting control system according to claim 1, wherein at least one lighting node comprises:
   an object detector connected to the controller; and
   a memory adapted to store information identifying at least one other lighting node which is associated by the processing component to the same group of interrelated coordinates,
   wherein this at least one lighting node is adapted to send a control signal to one or more of the at least one other lighting node identified by the information in the memory upon detection of an object by the object detector for controlling the light source of said one or more of the at least one other lighting node.

5. Lighting control system according to claim 4, wherein the control signal comprises light level information for controlling the intensity of the light source of said at least one other lighting node, the light level information being based on information about the separation between the at least one lighting node and said at least one other lighting node.

6. Lighting control system according to claim 4, wherein the object detector is a motion detector adapted to detect the speed of the detected object and the at least one lighting node is adapted to send a control signal to a selected at least one other lighting node based upon the speed detection by the motion detector.

7. Lighting control system according to claim 4, wherein the lighting node which comprises the object detector is arranged to send a control signal to a selection of the at least one other lighting node identified by the information in the memory upon detection of an object by the object detector, the selection being based on a control signal previously received by said lighting node.

8. Lighting control system according to claim 1, wherein each lighting node is adapted to communicate its location to the processing component.

9. Lighting control system according to claim 1, wherein the lighting control system further comprises a database component connected to the processing component, the database component comprising a database which relates information identifying the lighting nodes to the geographical location of the nodes.

10. Lighting control system according to claim 1, further comprising a visualization component connected to the processing component and adapted to show the locations of the lighting nodes in the network and/or the at least one group of interrelated coordinates on a map on an electronic display.

11. Lighting control system according to claim 1, further comprising a configuration component connected to the memory component of the lighting control system and adapted to edit the information related to the at least one group of interrelated coordinates stored in said memory component on the basis of user input.

12. Lighting control system according to claim 1, wherein at least one of the at least one group of interrelated coordinates represents a path defined in the geographical coordinate system.

13. Lighting control system according to claim 12, wherein the processing component is further adapted to determine intersections of paths and to automatically associate at least one lighting node with at least one intersection on the basis of the location of the respective lightning node.

14. Lighting control system according to claim 1, wherein the processing component is further adapted to automatically generate groups of interrelated coordinates on the basis of geographical data.

15. Lighting control system according to claim 1, wherein each of the number of lighting nodes further comprises:
   a memory component; and
   a processing component.

16. Method for associating a node of a multi-node network with at least one other node of the network, comprising:
   storing information relating to groups of interrelated coordinates defined in a geographical coordinate system;
   determining the location of said node in the geographical coordinate system and then storing the determined location within an internal memory within the said node;
   automatically associating said node to at least one of the groups of interrelated coordinates on the basis of the location of the node by determining which groups of interrelated coordinates are within a predetermined distance from the at least one lighting node; and
   automatically associating said node to at least one other node being associated with the same group of interrelated coordinates, by determining which groups of interrelated coordinates are within a predetermined distance from the at least one lighting node.

17. Method according to claim 16, further comprising:
   automatically determining the separation between said node and said at least one other node being associated with the same group of interrelated coordinates.

18. Method according to claim 16, further comprising:
   storing the information relating to the groups of interrelated coordinates on a server connected to the multi-node network; and
   sending information from the server to the node on the basis of the associated group of interrelated coordinates.

19. Method according to claim 16, wherein determining the location of the node comprises providing a database which associates nodes with geographical locations.

20. Method according to claim 19, wherein determining the location of the node comprises:
   providing the node with an identifier;
   determining the identifier associated with the node;
   determining the geographical location of the node; and
   storing the identifier and corresponding geographical location in the database.

21. Method according to claim 16, further comprising showing the location of at least one of the nodes and/or at least one of the groups of interrelated coordinates on a map on an electronic display.

22. Method according to claim 16, further comprising automatically determining groups of interrelated coordinates on the basis of geographical data.

* * * * *